Figure 3:
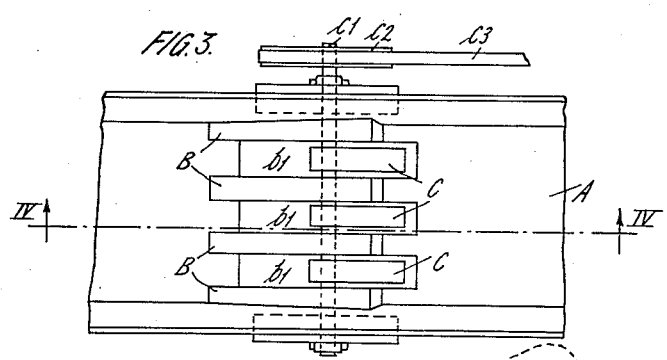

April 19, 1932.  F. C. GILES  1,855,047
APPARATUS FOR CONTROLLING THE DELIVERY OF ARTICLES FROM CHUTES
Filed Nov. 4, 1930    5 Sheets-Sheet 1
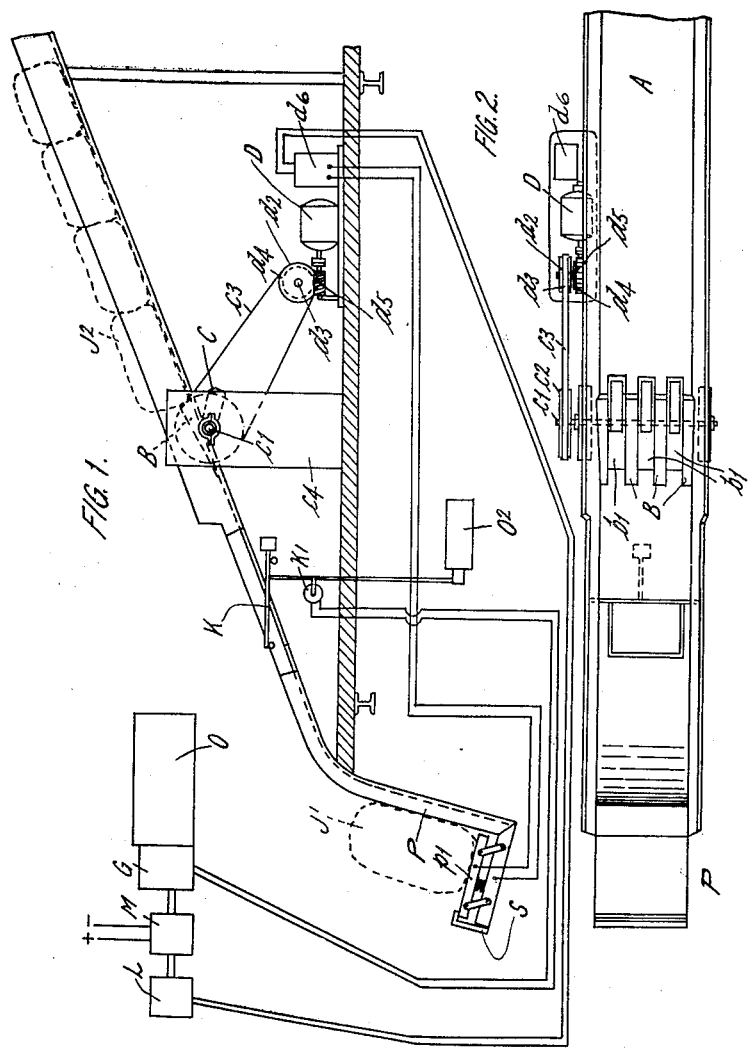
Inventor:
Frank Charles Giles,
By Spear, Donaldson & Hall
Attys.

April 19, 1932. F. C. GILES 1,855,047
APPARATUS FOR CONTROLLING THE DELIVERY OF ARTICLES FROM CHUTES
Filed Nov. 4, 1930   5 Sheets-Sheet 2

Inventor:
Frank Charles Giles,
By Spear, Donaldson & Hill
Attys.

April 19, 1932.  F. C. GILES  1,855,047
APPARATUS FOR CONTROLLING THE DELIVERY OF ARTICLES FROM CHUTES
Filed Nov. 4, 1930   5 Sheets-Sheet 3
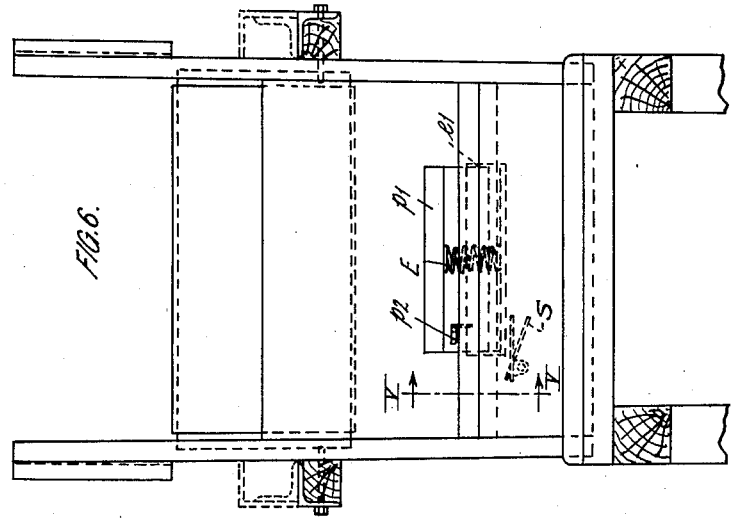
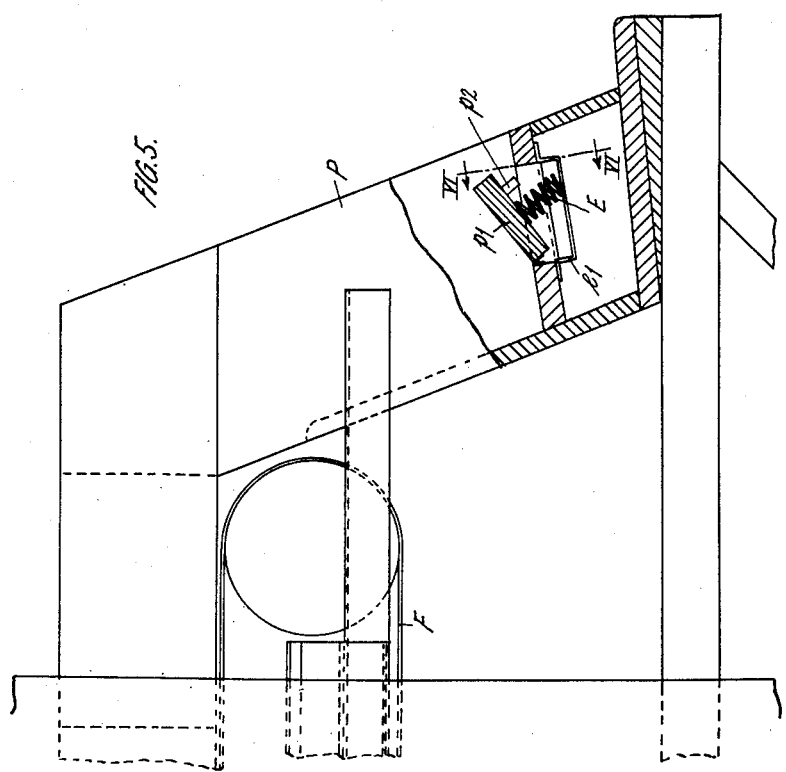
Inventor:
Frank Charles Giles,
By *Spear, Donaldson & Hall*
Attys.

April 19, 1932.  F. C. GILES  1,855,047
APPARATUS FOR CONTROLLING THE DELIVERY OF ARTICLES FROM CHUTES
Filed Nov. 4, 1930   5 Sheets-Sheet 4
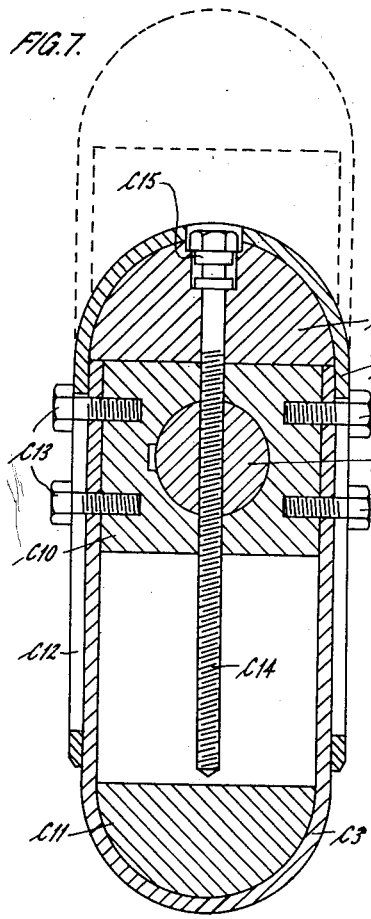
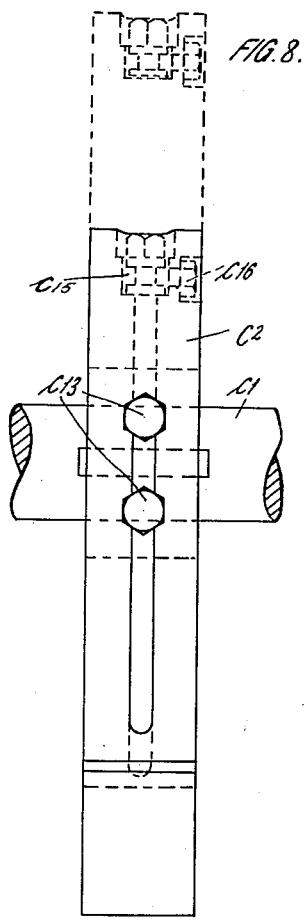
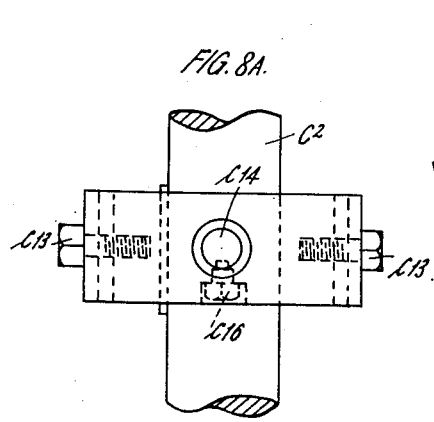
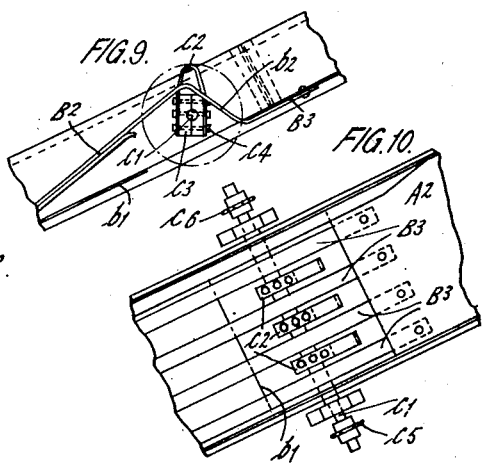
Inventor:
Frank Charles Giles, April 19, 1932. F. C. GILES 1,855,047
APPARATUS FOR CONTROLLING THE DELIVERY OF ARTICLES FROM CHUTES
Filed Nov. 4, 1930 5 Sheets-Sheet 5
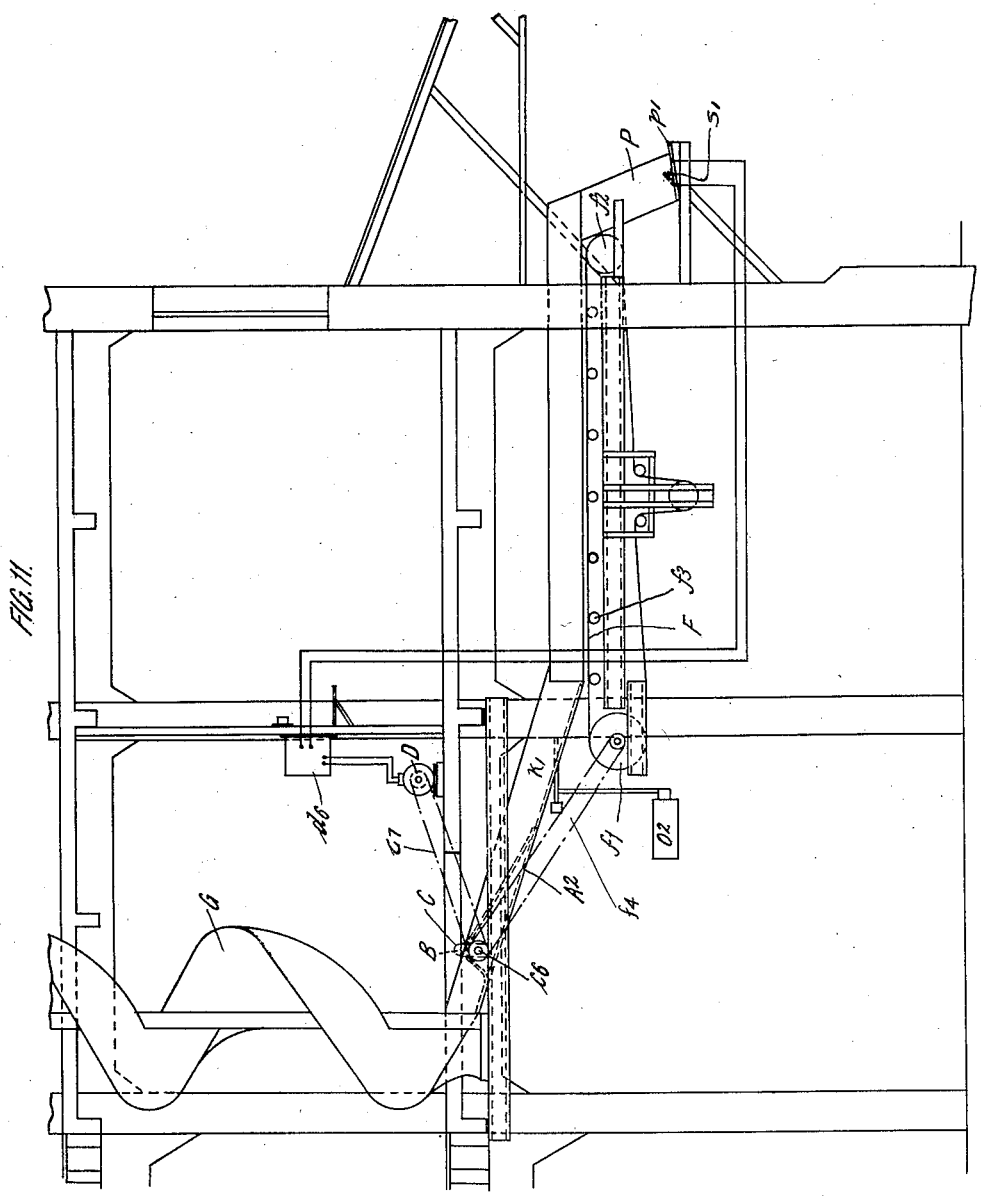
Inventor:
Frank Charles Giles,
By Spear, Daneden + Hall
Attys.

Patented Apr. 19, 1932

1,855,047

UNITED STATES PATENT OFFICE

FRANK CHARLES GILES, OF LONDON, ENGLAND, ASSIGNOR TO SPILLERS LIMITED, OF LONDON, ENGLAND, A BRITISH COMPANY

APPARATUS FOR CONTROLLING THE DELIVERY OF ARTICLES FROM CHUTES

Application filed November 4, 1930, Serial No. 493,451, and in Great Britain November 6, 1929.

This invention relates to apparatus for separating and controlling the delivery of bales, sacks, casks and the like conveyed by gravity chutes, conveyor bands or the like.

According to the invention the apparatus comprises;—a delivery chute or conveyor as hereinafter described, to the feeding end of which the articles to be delivered, which will be assumed to be sacks, are supplied in any convenient manner; a fixed mechanical barrier in the chute which forms an abutment which arrests the movement of the sack engaging with it, and, of course, the movement of succeeding sacks in contact; a power— preferably of an electric motor—operated barrier-clearing device by means of which each sack is in succession lifted over the barrier, the time taken to lift the sack over the barrier being sufficient to ensure a definite space interval between successive sacks moved over the barrier; and a stop device and control means therefor adapted to stop the electric or other motor by which the apparatus is operated.

The control means may be adapted to be operated by a loading attendant receiving and loading the sacks; or by the movement of the platform of a delivery stool, due to the weight of a sack delivered to the said stool.

The control switch actuated by the loading attendant or by the movement of the delivery stool, is preferably so connected to a starting and stopping switch in the circuit of the motor by which the apparatus is driven, that the motor circuit is opened when the apparatus has to be stopped, and the starting connections made at the motor starter when the apparatus has again to be driven.

In one modification the barrier is formed by a number of laterally spaced inclined abutments, the upstanding edges of which engage the leading end of a sack as it reaches the barrier; and the barrier-clearing device may comprise a series of rotating arms interleaved between the abutments and adapted gradually to lift the sack over the abutments, the time taken to effect this being sufficient to ensure that the preceding sack will have reached a point the necessary distance from the barrier to ensure the desired interval between successive sacks, before the next sack has been passed over the barriers.

A convenient arrangement is as follows:—

An inclined chute is provided down which the sacks or the like are adapted to pass; where an inclined chute cannot conveniently be fitted, a horizontal chute, or an upwardly inclined chute may be employed with a band to convey the sacks or the like to the barrier, and to the delivery point. At a convenient point in the chute a barrier is provided, comprising a series of longitudinally disposed blocks fixed, with suitable intervening spaces, across the chute; the ends of these blocks are in line transversely across the chute and they effectively arrest the progress of a sack when it abuts against them. As the arms of the barrier clearing device move upwardly they engage the under side of the sack and gradually lift it and propel it over the barrier; the lifting action commencing at the forward end of the sack, and the operation needing several rotations of the arms to propel the sack over the barrier. The tops of the barrier blocks may slope downwardly and forwardly.

As soon as a sack is clear of the barrier it slides down or is propelled along the chute and passes to the lower or delivery end of the chute.

A delivery stool or platform is usually provided on to which the sacks are delivered from the chute, and it may be so arranged that when a sack or package rests on it the apparatus is stopped so that the barrier clearing device ceases to operate, this may be effected by making the stool movable under the weight of the sack or the like, and arranging for such movement to operate a switch so as to stop the motor which drives the apparatus; with this arrangement, as soon as a sack leaves the delivery point the mechanism automatically delivers another sack which on reaching the delivery point again causes a stoppage of the apparatus.

I have illustrated my invention, by way of example, in the following drawings, in which;—

Figs. 1 and 2 illustrate diagrammatically the general arrangement when the invention is applied to control the movement of single sacks, from an inclined chute to which they are delivered from a warehouse, to a loading platform from which they are transferred to motor lorry, motor wagon, barge or the like.

Fig. 1 being an elevation.
Fig. 2 a plan.
Fig. 3 is an enlarged part plan; and
Fig. 4 a correspondingly enlarged part elevation, showing the barrier clearing device.

Figure 6A:
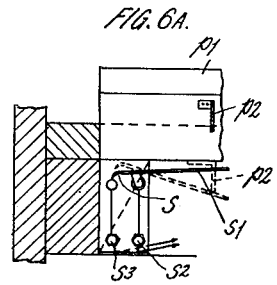

Figs. 5 to 6A show the preferred construction of the said device by which the motor operating the barrier clearing device is controlled by a moving part in the bottom of the loading platform.

Figure 5A:
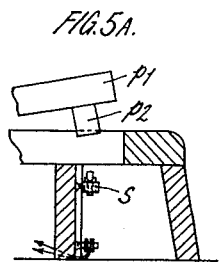

Fig. 5 being an elevation partly in section.
Fig. 5A a section on the line V, V of Fig. 6.
Fig. 6 an end view, and
Fig. 6A a section on the line VI, VI of Fig. 5, and Figs. 7 to 8A illustrate an adjustable form of barrier clearing device.

Fig. 7 being a side elevation in section.
Fig. 8 a front elevation, and
Fig. 8A a plan.

Figs. 9 and 10 show a preferred construction of the barrier and barrier clearing device in which the wood abutments of Fig. 1 are replaced by metal barriers and the metal barrier clearing device.

Fig. 9 being an elevation, and
Fig. 10 a plan;

Fig. 11 is a general elevation showing the barrier clearing device of Figs. 9 and 10 applied to a case in which sacks delivered from the upper floor of a warehouse through a spiral chute have to be controlled so as to be delivered one at a time on to a loading stool adjacent to roadway, railway, canal or the like.

Referring first to Figs. 1 and 2;—The sacks J to be delivered are supplied to the upper end of a chute A, no attempt being being made to ensure any interval between them, with the result that from the barrier device B to the upper end of the chute, successive sacks are in contact with each other.

In the modification illustrated in Figs. 1 to 4, the barrier consists of a number of battens E arranged longitudinally, side by side, on the chute A, with spaces in between, the bottom being cut away as shown at $b1$ in alignment with the said spaces. The barrier clearing device in the modification of Figs. 1 and 2 is driven by a shaft $c1$ supported, in suitable bearings, transversely across the chute and just below the bottom of it; the shaft $c1$ has fitted to it a pulley $c2$ connected by a belt $c3$ to a pulley $d2$ mounted on a shaft $d3$ and fixed to a worm wheel $d4$, driven by a worm $d5$, mounted on the spindle of an electric motor D controlled by starting gear $d6$.

The barrier clearing device consists of a number of arms C rigidly secured to the shaft $c1$; these arms are interleaved with the barrier battens, and their ends as they rotate move upwardly through the openings $b1$.

Figure 4:
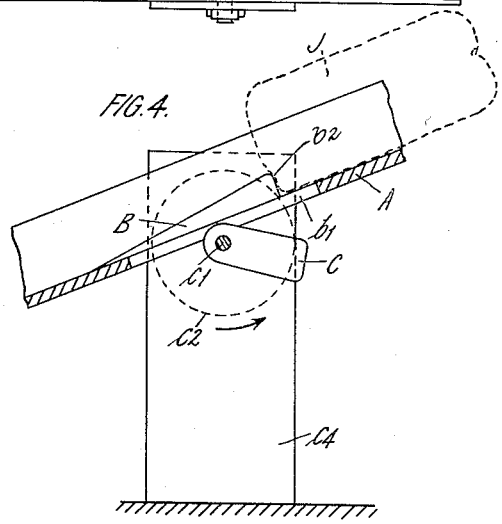

The vertical ends $b2$ of the barrier battens arrest the foremost sack of those on the chute above the barrier, as shown in Fig. 4, and it will be seen that if the shaft $c1$ be rotated in the direction of the arrow, the arms C engage the front portion of the sack and lift it over the edge $b2$, and that at each successive revolution the sack is pushed further over the barrier, until finally when its tail is clear of the barrier it slides along the lower portion of the chute, and may be delivered to the attendant in the vehicle or barge which is being loaded, the speed of the barrier clearing device being arranged to give the necessary interval between successive sacks.

Preferably, however, the sack, is delivered on to a loading stool P located in such position that the sacks may be transferred by the loader from the loading stool on to the platform of the vehicle, barge or the like. If the bottom $p1$ of the loading stool be made movable vertically, and be retained in its upper position by a spring exerting an upward force less than the weight of the lightest of the sacks to be dealt with, and if the said bottom be fitted with a switch S (Fig. 1) which is opened when the bottom is depressed by the weight of a sack on it, and the said switch be so connected to the motor starter $d6$ that when the switch is opened the motor D is stopped, it will be seen that as soon as a sack J' lands on the loading stool, the barrier clearing device is stopped. As stated, the barrier clearing device has to make a number of revolutions before it clears a sack, and as a result the sack J2 is detained at the barrier until the sack J' is removed from the platform stool.

This arrangement facilitates loading very considerably, since the loader, after he has located a sack on the vehicle or the like, finds another one ready for him in the loading stool.

The separation of the sacks by the barrier clearing device therefor offers many advantages in dealing with sacks, parcels and the like, apart from the loading advantages mentioned; for example, the barrier clearing device may be combined with a counting device comprising a spring controlled counting plate K in the part of the chute beyond the barrier device, which is operated by the sacks as they pass over it; this plate operates a mechanical counter $o2$ and is also interlocked through switches $k1$, L, M and G with a check counter O, this counting arrangement forms the subject matter of a concurrent application for a patent Ser. No. 493,450.

The preferred arrangement of the loading stool and its switchgear is illustrated in Figs. 5A, 6 and 6A;—The movable bottom is a hinged portion $p1$, normally held in the position shown in Fig. 5 by a spring E supported by a bracket $e1$, the part $p1$ being fitted with a switch actuating plate $p2$, which, when the part $p1$ is depressed (see dotted lines Fig. 6A) engages the tail $s1$ of the switch S, and so breaks the circuit between the terminals $s2$ and $s3$ from which leads are taken to the starter or control device of the motor which operates the barrier clearing device.

In the example illustrated in Figs. 5 and 6, the sacks are delivered to the loading stool by a conveyor band F, as shown in Fig. 11 and to be described later.

The preferred construction of the barrier and barrier clearing device is shown in Figs. 9 and 10; in this case the barrier instead of being composed of battens B is built up of lengths of bar iron $B2$, $b2$, $B3$, bent to shape and secured to an inclined chute $A2$, as shown, so as to provide a profile similar to that of the wood battens B, the faces $b2$ which abut against the ends of the sacks being sloped as shown so as to give a somewhat easier movement of the sacks over the barrier. In this case the barrier clearing device is also constructed of metal comprising lengths of bar iron bent to shape as shown at $c2$ and secured to the shaft $c1$ by clamps $c3$. The shaft $c1$ instead of being driven by a belt as in Fig. 1 is preferably driven by a chain wheel $c5$.

Where the sacks are delivered to a loading stool by a band conveyor, a chain wheel $c6$ is fitted to the shaft $c1$ so that the said band runs or stops accordingly as the barrier clearing device runs or stops.

Fig. 11 shows an application of the invention to a flour mill warehouse, where the sacks are stored on the upper floors, and require to be delivered to a loading stool P, located at suitable height above the roadway to a chute, a motor waggon, or a railway truck on an adjacent railway line, or a barge or ship in a dock. The sacks located on any of the upper floors are delivered to a spiral chute G, from the lower end of which they pass by their momentum on an inclined chute $A2$ fitted with a barrier and barrier clearing device as described in connection with Figs. 9 and 10. From the end of the chute $A2$ the sacks pass on to a conveyor F, carried on the end pulleys $f1$, $f2$, and intermediate rollers $f3$, and driven by a chain $f4$ from the chain wheel $c6$ on the barrier clearing shaft, which shaft in turn is driven from the motor D by a chain wheel $c7$ engaging the pinion $c5$ of Fig. 10. $d6$ is the motor starter or control device which is controlled by the switch S on the hinged plate $p1$ of the loading stool P.

The sacks having descended the spiral chute G, are arrested by the barrier B until the foremost sack is released by the operation of the barrier clearing device as described; the released sack then passes down the chute $A2$ and down to the band conveyor F, and is conveyed by the said band conveyor to the loading stool P, which may therefore be located in any desired position in relation to the barrier-clearing device.

When the sack on reaching the loading stool depresses the movable part $p1$ and opens the switch S' connected to the starter $d6$, the motor, the barrier-clearing device and the band F are stopped; the sacks may continue to accumulate in the chute G, and there may be sacks on the band F at the moment it stops, but such latter sacks remain stationary until the sack on the loading stool is removed, whereupon the circuit of the motor is again completed and the barrier clearing device delivering sacks on to the band F, and the sacks on the band F being delivered as described to the loading stool P.

As stated, no further sacks are delivered to the loading attendant until he has disposed of the sack previously delivered and removed the next one from the loading stool.

In some cases the controller $d6$ is connected to a switch located conveniently for operation by the loading attendant so that he can control the motor independently by the switch S.

The motor controller $d6$ is usually provided with means, for example, a rheostat switch and variable resistance in the shunt winding of the motor, by which the speed of the motor D may be varied, so that the interval between the removal of one sack from the loading stool, and the delivery of the next sack to it may be of such duration as to suit the loading conditions.

In some cases this interval is required to be reduced to a greater extent than can be obtained within the limits between which the motor speed can be controlled. In such cases we prefer to use a barrier clearing device of the type illustrated in Figs. 7, 8 and 8a, in which $c10$ are clamps keyed to the barrier clearing device shaft $c1$, and to these clamps are permanently secured bar iron strips $c3$ of suitable shape to form ordinary barrier clearing arms, the curved portions being strengthened by semi-circular ends $c11$. Secondary arms $c4$, which may be of bar iron, and similar in shape to $c3$, are slotted as at $c12$, bolts $c13$ screwing into the clamps and passing through the slots, the parts $c2$ and $c3$ sliding over each other. The arm $c4$ is fitted with a traversing screw $c14$ held fixed axially relatively thereto by a collar $c15$ and stud $c16$. When the screws $c13$ are slackened and the traversing screw operated the arm C4 may be extended to the position shown in dotted lines, thus providing a barrier clearing device with two similar symmetrically arranged arms. With a barrier-clearing device of this type the sack is moved forward across the barrier twice in each revolution which is equivalent to increasing the motor speed 100 per cent. The use of a barrier clearing device of Fig. 8 combined with a motor of variable speed enables the time taken to move a sack over the barrier to be varied within wide limits.

The construction of the barrier and its clearing device may be modified in various ways to suit the goods to be delivered, comprising in each case a barrier which arrests the sack, packing case, barrel or the like, and which the latter can surmount only when assisted by the barrier clearing device, the time taken to clear determining the interval between the successive articles.

The details of construction would be modified in accordance with the size and duty of the apparatus.

Having now fully described my invention I declare that what I claim and desire to secure by Letters Patent is:—

1. The improvement in apparatus for separating and controlling the delivery of articles such as sacks, bales, casks and the like, as they are propelled along conveying means in such manner that their motion may be arrested, according to which a fixed barrier is placed in the line of the conveying means which is adapted to arrest the movement of the articles engaging with it, a barrier clearing device, power operated means for driving it, and control apparatus adapted to start and stop said means being provided, said barrier clearing device being adapted gradually to lift the articles in succession over the barrier, the time taken to lift the article over the barrier being sufficient to ensure a definite space interval between the articles as they pass on to the portion of the conveying means beyond the fixed barrier; said conveying means terminating in a loading stool, on to which the successive articles, separated by the barrier device, are delivered by the said conveying means, a part of the said stool on to which the articles are delivered being adapted to be moved by the weight of the article in opposition to a force tending to resist such movement, and said movement actuating the barrier clearing device control apparatus so as to stop the said device whilst the article is in position on the stool; substantially as described.

2. The combination with the apparatus constructed in accordance with claim 1, of a part located in the line of the conveying means beyond the barrier to which movement is imparted, in opposition to a restoring force, by each of the articles as it passes over it, and a counter actuated by the said means; substantially as described.

3. Apparatus as claimed in claim 1, in which the operation of the portion of the conveying means between the fixed barrier and the stool is controlled by the control apparatus of the barrier-clearing device actuated by the loading stool, so that the said portion is operative to convey only when the barrier-clearing device is operative; substantially as described.

4. Apparatus constructed in accordance with claim 1, in which the sacks, casks and the like articles have to be delivered to a loading stool from a floor above the loading stool, comprising;—a spiral conveyor extending from the said floor vertically downwards to an intermediate point; a straight inclined gravity conveyor forming an extension of the lower end of the spiral conveyor, the barrier and the barrier-clearing device being located in the latter conveyor; a loading stool; and a band conveyor forming an extension of the gravity conveyor, and delivering the articles on to the loading stool; the band conveyor and the barrier-clearing device being driven by an electric motor controlled by the switch operated by the loading stool.

5. The improvement in apparatus for separating and controlling the delivery of articles such as sacks, bales, casks and the like, as they are propelled along conveying means in such manner that their motion may be arrested, according to which there is located in the line of the conveying means a barrier, comprising transversely spaced longitudinally fixed barrier members adapted to arrest the said articles on the conveyor, and so arranged in relation to the conveyor that the spaces between the barrier members are not occupied by the conveyor; and a barrier-clearing device comprising a rotating shaft transversely arranged across the conveyor and carrying arms interleaved with the barrier members, said arms as they rotate passing through the said spaces and being adapted gradually to lift the articles over the barrier, the time taken to lift the article over the barrier being sufficient to ensure a definite space interval between the articles as they pass on to the portion of the conveying means beyond the fixed barrier; substantially as described.

6. In apparatus as claimed in claim 5, a barrier-clearing device having a set of arms which are radially adjustable relatively to the shaft so that the extent to which the sack or the like is moved over the barrier at each revolution may be regulated; substantially as described.

7. In apparatus as claimed in claim 5, a barrier-clearing device consisting of two sets of diametrically disposed arms adapted to interleave with the barriers, one of the said set of arms being adjustable in a radial direction so that one or two sets of arms may be rendered effective accordingly as it is required to make one or two working strokes per revolution; substantially as described.

8. Apparatus for separating and controlling the delivery of aricles such as sacks, bales and the like, comprising in combination;—a gravity chute to which the articles are fed, a barrier in the line of the said chute, a barrier clearing device driven by an electric motor and adapted to move the articles over the barrier, a band conveyor on to which the articles are delivered by the barrier-clearing device, gearing between the said band conveyor and the barrier clearing device, a loading stool into which the articles are delivered by the said band conveyor, an electric switch opened by the weight of a sack when it is in the delivery stool, an electric motor to drive the barrier clearing device, and means controlled by the said switch adapted to disconnect the motor from its electric supply whilst the article is located in the said stool, and stop the barrier-clearing device and the conveyor band; substantially as described.

FRANK CHARLES GILES.